US012326338B2

United States Patent
Tatsumoto et al.

(10) Patent No.: US 12,326,338 B2
(45) Date of Patent: Jun. 10, 2025

(54) SERVER APPARATUS, INFORMATION PROCESSING SYSTEM, MEDIUM, AND METHOD OF OPERATING INFORMATION PROCESSING SYSTEM

(71) Applicant: Toyota Jidosha Kabushiki Kaisha, Toyota (JP)

(72) Inventors: Yuki Tatsumoto, Nagoya (JP); Toshiki Kashiwakura, Ota-ku (JP); Manabu Ishihara, Nagoya (JP); Akira Sasaki, Miyoshi (JP); Scott R. Meyer, Allen, TX (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 211 days.

(21) Appl. No.: 17/399,293

(22) Filed: Aug. 11, 2021

(65) Prior Publication Data
US 2022/0049964 A1    Feb. 17, 2022

(30) Foreign Application Priority Data
Aug. 11, 2020 (JP) ................. 2020-135996

(51) Int. Cl.
  G01C 21/34 (2006.01)
  G01C 21/36 (2006.01)
  G08G 1/00 (2006.01)
  H04W 4/021 (2018.01)
  H04W 4/44 (2018.01)

(52) U.S. Cl.
  CPC ..... *G01C 21/3438* (2013.01); *G01C 21/3691* (2013.01); *G08G 1/202* (2013.01); *H04W 4/021* (2013.01); *H04W 4/44* (2018.02)

(58) Field of Classification Search
  CPC ............ G01C 21/3438; G01C 21/3691; G08G 1/202; H04W 4/021; H04W 4/44
  See application file for complete search history.

(56) References Cited

U.S. PATENT DOCUMENTS

| | | | |
|---|---|---|---|
| 10,134,286 B1 * | 11/2018 | Elswick | G06Q 10/02 |
| 11,729,859 B2 * | 8/2023 | Pan | H04W 48/18 |
| | | | 709/203 |
| 2017/0169535 A1 * | 6/2017 | Tolkin | G01C 21/3438 |
| 2017/0365030 A1 * | 12/2017 | Shoham | G08G 1/207 |
| 2018/0012148 A1 * | 1/2018 | Law Hui Horng | G06Q 10/06 |
| 2018/0211541 A1 * | 7/2018 | Rakah | G06Q 10/047 |
| 2018/0238694 A1 | 8/2018 | Bellotti et al. | |

(Continued)

FOREIGN PATENT DOCUMENTS

| | | |
|---|---|---|
| JP | 2019135616 A | 8/2019 |
| JP | 2019526850 A | 9/2019 |

(Continued)

*Primary Examiner* — Rachid Bendidi
*Assistant Examiner* — Nada Mahyoob Alqaderi
(74) *Attorney, Agent, or Firm* — Dinsmore & Shohl LLP (57) ABSTRACT

A server apparatus includes a communication interface and a controller configured to transmit/receive information to/from another apparatus via the communication interface. When a first boarding location is specified by a terminal apparatus, the controller notifies, to the terminal apparatus, a second boarding location which is within a predetermined distance range from the first boarding location, and reachable by a dispatchable vehicle earlier than the first boarding location.

16 Claims, 7 Drawing Sheets

(56) References Cited

U.S. PATENT DOCUMENTS

| | | | |
|---|---|---|---|
| 2018/0356830 A1* | 12/2018 | Haghighat | H04L 67/306 |
| 2019/0244522 A1 | 8/2019 | Makita et al. | |
| 2019/0275994 A1* | 9/2019 | Zhao | B60T 1/10 |
| 2020/0104965 A1* | 4/2020 | Ramot | G08G 1/202 |
| 2020/0124427 A1* | 4/2020 | Kline | G07B 15/06 |
| 2020/0232809 A1* | 7/2020 | Rogan | G06V 20/00 |
| 2021/0163040 A1 | 6/2021 | Kojo | |
| 2021/0248704 A1* | 8/2021 | Wang | G06Q 50/40 |
| 2022/0027800 A1* | 1/2022 | Ramot | G06Q 10/06311 |
| 2022/0221867 A1* | 7/2022 | Taveira | G05D 1/617 |

FOREIGN PATENT DOCUMENTS

| | | | | |
|---|---|---|---|---|
| JP | 2019-212118 A | | 12/2019 | |
| JP | 2019-212188 A | | 12/2019 | |
| JP | 2020-522789 A | | 7/2020 | |
| KR | 20170041237 A | * | 4/2017 | G06Q 10/02 |
| WO | 2018140505 A1 | | 8/2018 | |
| WO | 2018/217640 A1 | | 11/2018 | |
| WO | 2018219306 A1 | | 12/2018 | |
| WO | 2019220205 A1 | | 11/2019 | |

* cited by examiner

SERVER APPARATUS, INFORMATION PROCESSING SYSTEM, MEDIUM, AND METHOD OF OPERATING INFORMATION PROCESSING SYSTEM

CROSS-REFERENCE TO RELATED APPLICATION

This application claims priority to Japanese Patent Application No. 2020-135996, filed Aug. 11, 2020, the entire contents of which are incorporated herein by reference.

TECHNICAL FIELD

The present disclosure relates to a server apparatus, an information processing system, a medium, and a method of operating an information processing system.

BACKGROUND

Various forms of technology have been proposed to support vehicle dispatch for taxis or ridesharing. For example, with known technology, a server apparatus that communicates with a terminal apparatus of a passenger and with a vehicle transmits an instruction to the vehicle to dispatch the vehicle to a boarding location specified by the passenger, as in patent literature (PTL) 1.

CITATION LIST

Patent Literature

PTL 1: JP 2019-212188 A

SUMMARY

Vehicle dispatch support has room for improvement in passenger convenience by reducing the time from when the passenger requests vehicle dispatch until arrival of the vehicle.

A server apparatus according to the present disclosure includes a communication interface and a controller configured to transmit/receive information to/from another apparatus via the communication interface. When a first boarding location is specified by a terminal apparatus, the controller notifies, to the terminal apparatus, a second boarding location which is within a predetermined distance range from the first boarding location, and reachable by a dispatchable vehicle earlier than the first boarding location.

A medium according to the present disclosure is a non-transitory medium readable by a terminal apparatus configured to communicate with a server apparatus, the non-transitory medium storing a program which, when executed by the terminal apparatus, causes the terminal apparatus to execute operations including transmitting information specifying a first boarding location to the server apparatus, and receiving, from the server apparatus, a second boarding location which is within a predetermined distance range from the first boarding location, and reachable by a dispatchable vehicle earlier than the first boarding location.

A method according to the present disclosure is a method of operating an information processing system including a server apparatus and a terminal apparatus configured to communicate with each other, the method including transmitting, by the terminal apparatus, information specifying a first boarding location to the server apparatus, and notifying to the terminal apparatus, by the server apparatus, a second boarding location which is within a predetermined distance range from the first boarding location, and reachable by a dispatchable vehicle earlier than the first boarding location.

According to the present disclosure, passenger convenience in vehicle dispatch support can be improved.

DETAILED DESCRIPTION

Embodiments are described below.

Figure 1:
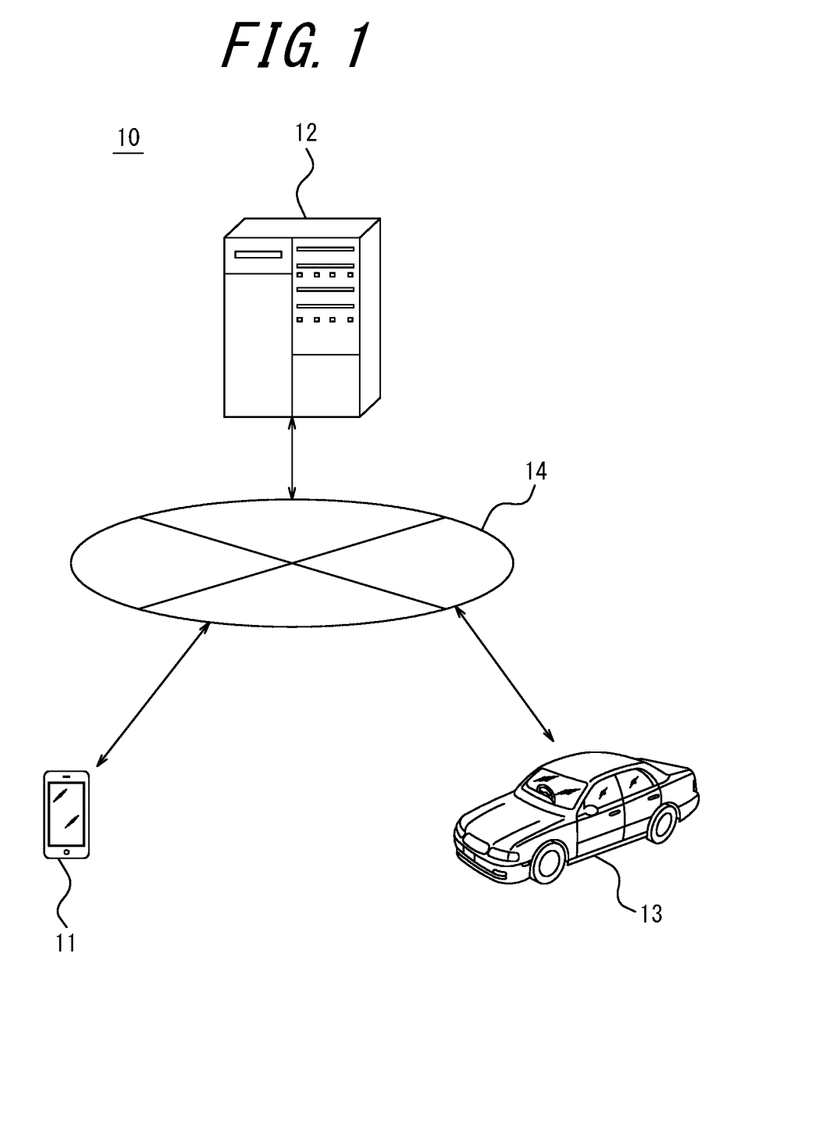
FIG. 1 is a diagram illustrating a configuration example of an information processing system.

FIG. 1 is a diagram illustrating a configuration example of an information processing system in an embodiment. An information processing system 10 supports vehicle dispatch in response to a request by a passenger using ridesharing or a taxi. The information processing system 10 includes a terminal apparatus 11 and a server apparatus 12 that connect to each other via a network 14 to communicate information. One or more vehicles 13 connect to the network 14 via respective vehicle-mounted apparatuses to communicate information. The vehicle 13 may be a taxi or any appropriate vehicle used in ridesharing. Examples of the terminal apparatus 11 include a mobile phone, a smartphone, a tablet, and a personal computer (PC). The server apparatus 12 is a server apparatus belonging to a cloud computing system or other computing system, for example, and implements various functions. In the present embodiment, the server apparatus 12 functions as a vehicle dispatch server for dispatching the vehicle 13. The network 14 is, for example, the Internet, but may include an ad hoc network, a local area network (LAN), a metropolitan area network (MAN), or other networks, or any combination thereof.

In the information processing system 10, the passenger with the terminal apparatus 11 launches a vehicle dispatch application on the terminal apparatus 11 to use a ridesharing or taxi dispatch service provided by the server apparatus 12. When a first boarding location (specified boarding location) is specified by the terminal apparatus 11, the server apparatus 12 notifies, to the terminal apparatus 11, a second boarding location (alternative boarding location) which is within a predetermined distance range from the specified boarding location and reachable by a dispatchable vehicle 13 earlier than the specified boarding location. The passenger sets a predetermined distance range over which movement is allowed. The passenger then moves on foot, for example, to the alternative boarding location specified by the server apparatus 12 within the distance range and boards the vehicle 13 dispatched to the alternative boarding location. This can improve passenger convenience, since the time until the vehicle 13 arrives can be shortened while placing an acceptable burden on the passenger. This can also improve time efficiency for the driver of the vehicle 13, who can board the passenger and begin charging more quickly.

Figure 2:
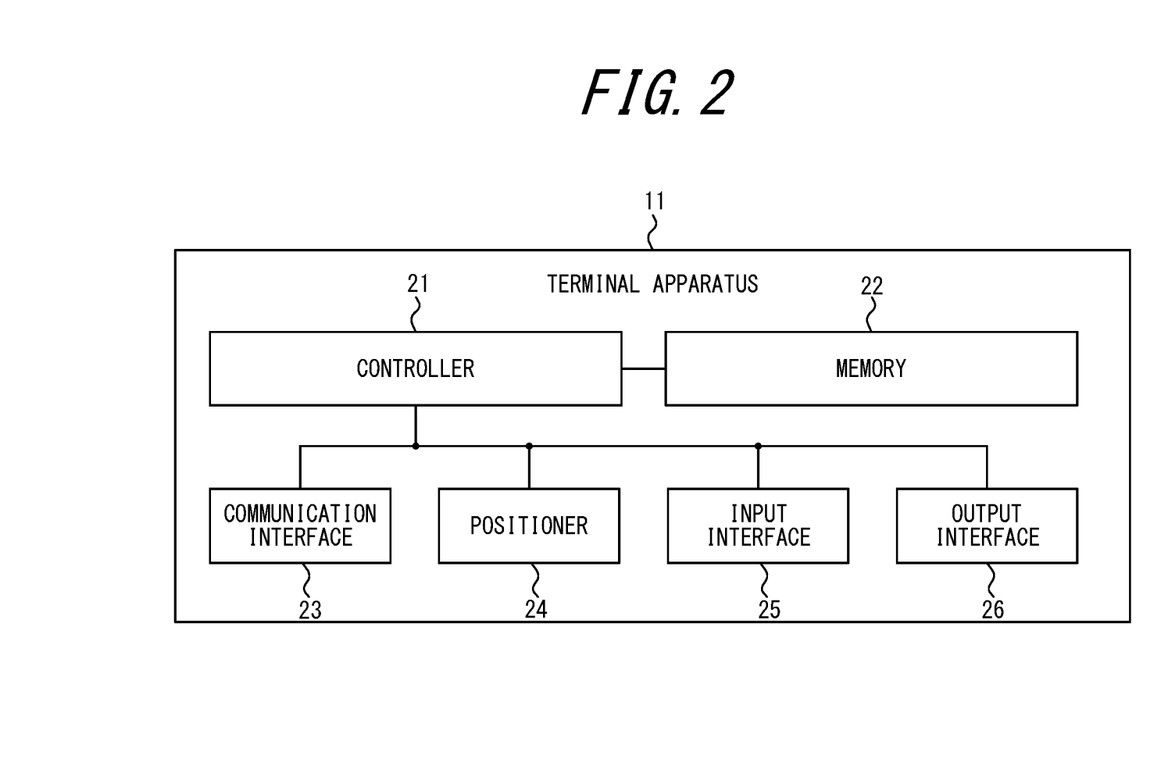
FIG. 2 is a diagram illustrating a configuration example of a terminal apparatus.

FIG. 2 illustrates an example configuration of the terminal apparatus 11. The terminal apparatus 11 includes a controller 21, a memory 22, a communication interface 23, a positioner 24, an input interface 25, and an output interface 26. The terminal apparatus 11 may, for example, be a mobile phone, a smartphone, a tablet, or a PC.

The controller 21 includes one or more processors, one or more dedicated circuits, or a combination thereof. The processor is, for example, a general purpose processor such as a central processing unit (CPU) or a dedicated processor that is dedicated to specific processing. Examples of dedicated circuits include a field-programmable gate array (FPGA) and an application specific integrated circuit (ASIC). The controller 21 executes information processing related to operations of the terminal apparatus 11 while controlling each component of the terminal apparatus 11.

The memory 22 includes one or more semiconductor memories, one or more magnetic memories, one or more optical memories, or a combination of at least two of these. The semiconductor memory is, for example, random access memory (RAM) or read only memory (ROM). Examples of RAM include static RAM (SRAM) and dynamic RAM (DRAM). Examples of ROM include electrically erasable programmable ROM (EEPROM). The memory 22 functions as, for example, a main memory, an auxiliary memory, or a cache memory. The memory 22 stores information for use in operations of the terminal apparatus 11 and information resulting from operations of the terminal apparatus 11.

The communication interface 23 includes one or more interfaces for communication. Examples of the interface for communication include an interface conforming to a mobile communication standard, such as Long Term Evolution (LTE), 4th Generation (4G), or 5th Generation (5G), and a LAN interface. The communication interface 23 receives information for use in operations of the terminal apparatus 11 and transmits information resulting from operations of the terminal apparatus 11. The terminal apparatus 11 is connected by the communication interface 23 to the network 14 via a nearby router or a base station for mobile object communication and communicates information with other apparatuses over the network 14.

The positioner 24 includes one or more Global Navigation Satellite System (GNSS) receivers. GNSS includes, for example, Global Positioning System (GPS), Quasi-Zenith Satellite System (QZSS), Global Navigation Satellite System (GLONASS), and/or Galileo. The positioner 24 acquires positional information for the terminal apparatus 11.

The input interface 25 includes one or more interfaces for input. The interface for input is, for example, a physical key, a capacitive key, a pointing device, a touch screen integrally provided with a display, or a microphone that receives audio input. The interface for input may further include a camera or IC card reader that captures images or image codes. The input interface 25 receives an operation for inputting information used in operations of the terminal apparatus 11 and transmits the inputted information to the controller 21.

The output interface 26 includes one or more interfaces for output. The interface for output is, for example, an external or built-in display for outputting information as an image or video, a speaker for outputting information as audio, or an interface for connecting with an external output device. The display is, for example, a liquid crystal display (LCD) or an organic electro luminescence (EL) display. The output interface 26 outputs information resulting from operations of the terminal apparatus 11.

The operations of the terminal apparatus 11 are implemented by a processor included in the controller 21 executing a program. The program can be recorded on a computer readable recording medium. The computer readable recording medium is, for example, a magnetic recording device, an optical disc, a magneto-optical recording medium, or a semiconductor memory. The program is, for example, distributed as a program recorded on a portable recording medium such as a Digital Versatile Disc (DVD) or a Compact Disc (CD)-ROM. The program may be distributed by storing the program in the storage of a server apparatus and transferring the program from the server apparatus to another computer. Some or all of the operations of the terminal apparatus 11 may be performed by a dedicated circuit included in the controller 21.

Figure 3:
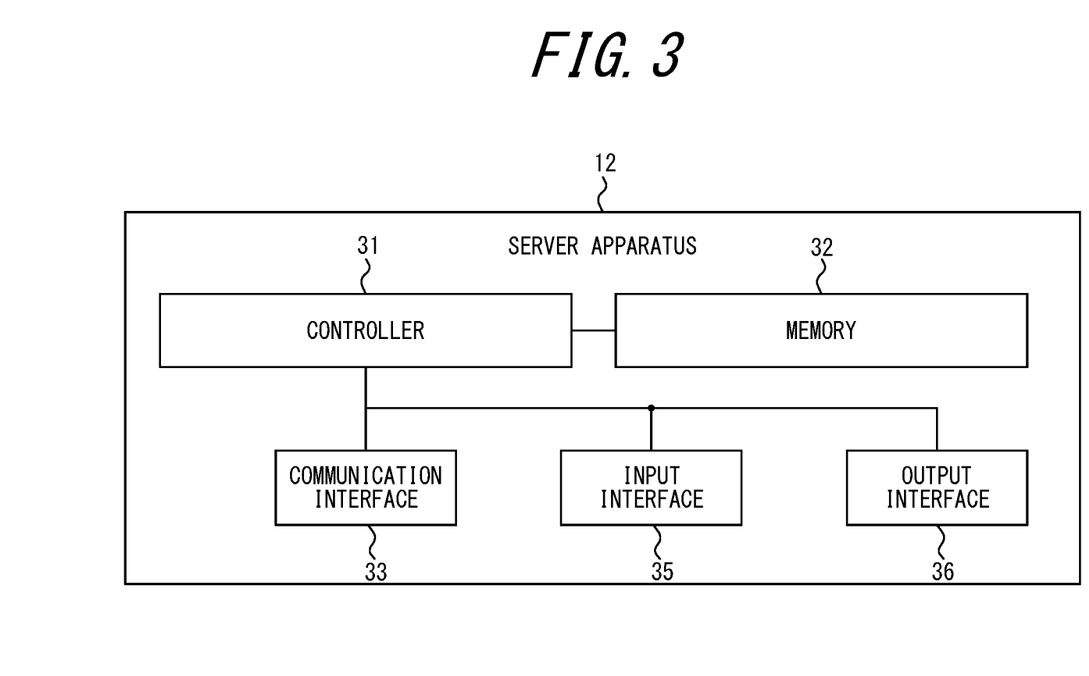
FIG. 3 is a diagram illustrating a configuration example of a server apparatus.

FIG. 3 illustrates an example configuration of the server apparatus 12. The server apparatus 12 includes a controller 31, a memory 32, a communication interface 33, an input interface 35, and an output interface 36. The server apparatus 12 is a server belonging to a cloud computing system or other computing system, for example, and implements various functions.

The controller 31 includes one or more processors, one or more dedicated circuits, or a combination thereof. The processor is a general purpose processor such as a CPU or a dedicated processor that is dedicated to specific processing. The dedicated circuit is, for example, an FPGA or an ASIC. The controller 31 executes information processing related to operations of the server apparatus 12 while controlling each component of the server apparatus 12.

The memory 32 includes one or more semiconductor memories, one or more magnetic memories, one or more optical memories, or a combination of at least two of these. The semiconductor memory is, for example, RAM or ROM. The RAM is, for example, SRAM or DRAM. The ROM is, for example, EEPROM. The memory 32 functions as, for example, a main memory, an auxiliary memory, or a cache memory. The memory 32 stores information for use in operations of the server apparatus 12 and information resulting from operations of the server apparatus 12.

The communication interface 33 includes one or more interfaces for communication. The interface for communication is, for example, a LAN interface. The communication interface 33 receives information for use in operations of the server apparatus 12 and transmits information resulting from operations of the server apparatus 12. The server apparatus 12 is connected to the network 14 by the communication interface 33 and communicates information with other apparatuses over the network 14.

The input interface 35 includes one or more interfaces for input. The interface for input is, for example, a physical key, a capacitive key, a pointing device, a touch screen integrally provided with a display, or a microphone that receives audio input. The interface for input may further include a camera or IC card reader that captures images or image codes. The input interface 35 receives an operation for inputting information used in operations of the server apparatus 12 and transmits the inputted information to the controller 31.

The output interface 36 includes one or more interfaces for output. The interface for output is, for example, a display or a speaker. The display is, for example, an LCD or an organic EL display. The output interface 36 outputs information resulting from operations of the server apparatus 12.

The functions of the server apparatus 12 are realized by execution of a control program by a processor included in the controller 31. The control program is a program for causing a computer to execute the processes of the steps included in operations of the server apparatus 12 so that the computer implements the functions corresponding to the processes of the steps. That is, the control program is a program for causing the computer to function as the server apparatus 12. Some or all of the functions of the server apparatus 12 may be realized by a dedicated circuit included in the controller 31.

Figure 4:
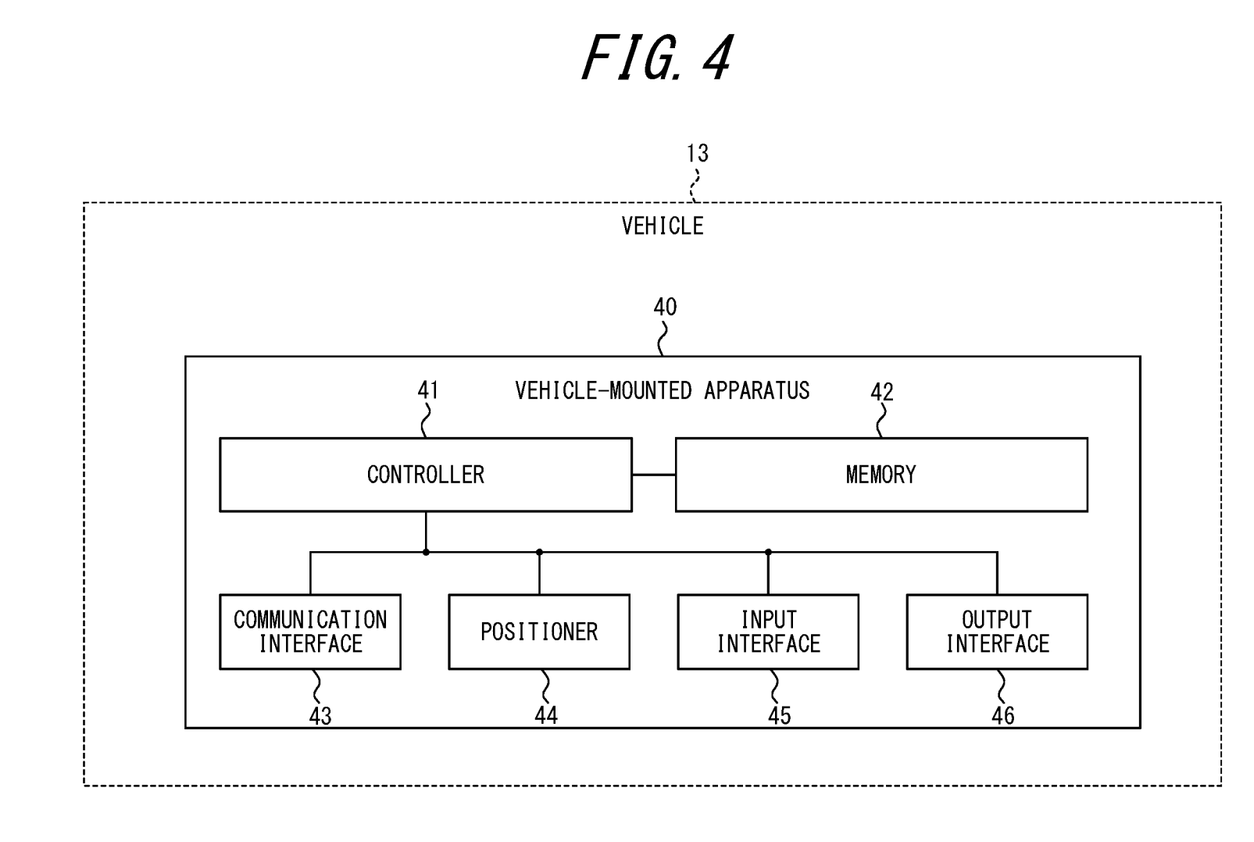
FIG. 4 is a diagram illustrating a configuration example of a vehicle-mounted apparatus.

FIG. 4 illustrates a configuration example of the vehicle-mounted apparatus 40 mounted in the vehicle 13. The vehicle-mounted apparatus 40 includes a controller 41, a memory 42, a communication interface 43, a positioner 44, an input interface 45, and an output interface 46. The vehicle-mounted apparatus 40 may, for example, be a navigation apparatus, a mobile phone, a smartphone, a tablet, or a PC.

The controller 41 includes one or more processors, one or more dedicated circuits, or a combination thereof. The processor is a general purpose processor such as a CPU or a dedicated processor that is dedicated to specific processing. The dedicated circuit is, for example, an FPGA or an ASIC. The controller 41 executes information processing related to operations of the vehicle-mounted apparatus 40 while controlling each component of the vehicle-mounted apparatus 40.

The memory 42 includes one or more semiconductor memories, one or more magnetic memories, one or more optical memories, or a combination of at least two of these. The semiconductor memory is, for example, RAM or ROM. The RAM is, for example, SRAM or DRAM. The ROM is, for example, EEPROM. The memory 42 functions as, for example, a main memory, an auxiliary memory, or a cache memory. The memory 22 stores information for use in operations of the vehicle-mounted apparatus 40 and information resulting from operations of the vehicle-mounted apparatus 40.

The communication interface 43 includes one or more interfaces for communication. Examples of the interface for communication include an interface conforming to a mobile communication standard, such as LTE, 4G, or 5G. The communication interface 43 receives information for use in operations of the vehicle-mounted apparatus 40 and transmits information resulting from operations of the vehicle-mounted apparatus 40. The vehicle-mounted apparatus 40 is connected by the communication interface 43 to the network 14 via a base station for mobile object communication and communicates information with other apparatuses over the network 14.

The positioner 44 includes one or more GNSS receivers. GNSS includes, for example, GPS, QZSS, GLONASS, and/or Galileo. The positioner 44 acquires positional information for the vehicle 13.

The input interface 45 includes one or more interfaces for input. The interface for input is, for example, a physical key, a capacitive key, a pointing device, a touch screen integrally provided with a display, or a microphone that receives audio input. The interface for input may further include a camera or IC card reader that captures images or image codes. The input interface 45 receives an operation for inputting information used in operations of the vehicle-mounted apparatus 40 and transmits the inputted information to the controller 41.

The output interface 46 includes one or more interfaces for output. The interface for output is, for example, a display or a speaker. The display is, for example, an LCD or an organic EL display. The output interface 46 outputs information resulting from operations of the vehicle-mounted apparatus 40.

The functions of the vehicle-mounted apparatus 40 are realized by execution of a control program by a processor included in the controller 41. The control program is a program for causing a computer to execute the processes of the steps included in operations of the vehicle-mounted apparatus 40 so that the computer implements the functions corresponding to the processes of the steps. That is, the control program is a program for causing the computer to function as the vehicle-mounted apparatus 40. Some or all of the functions of the vehicle-mounted apparatus 40 may be realized by a dedicated circuit included in the controller 41.

Next, operations performed by the terminal apparatus 11, the server apparatus 12, and the vehicle-mounted apparatus 40 of the vehicle 13 in cooperation are described with reference to FIGS. 5 to 7.

Figure 5:
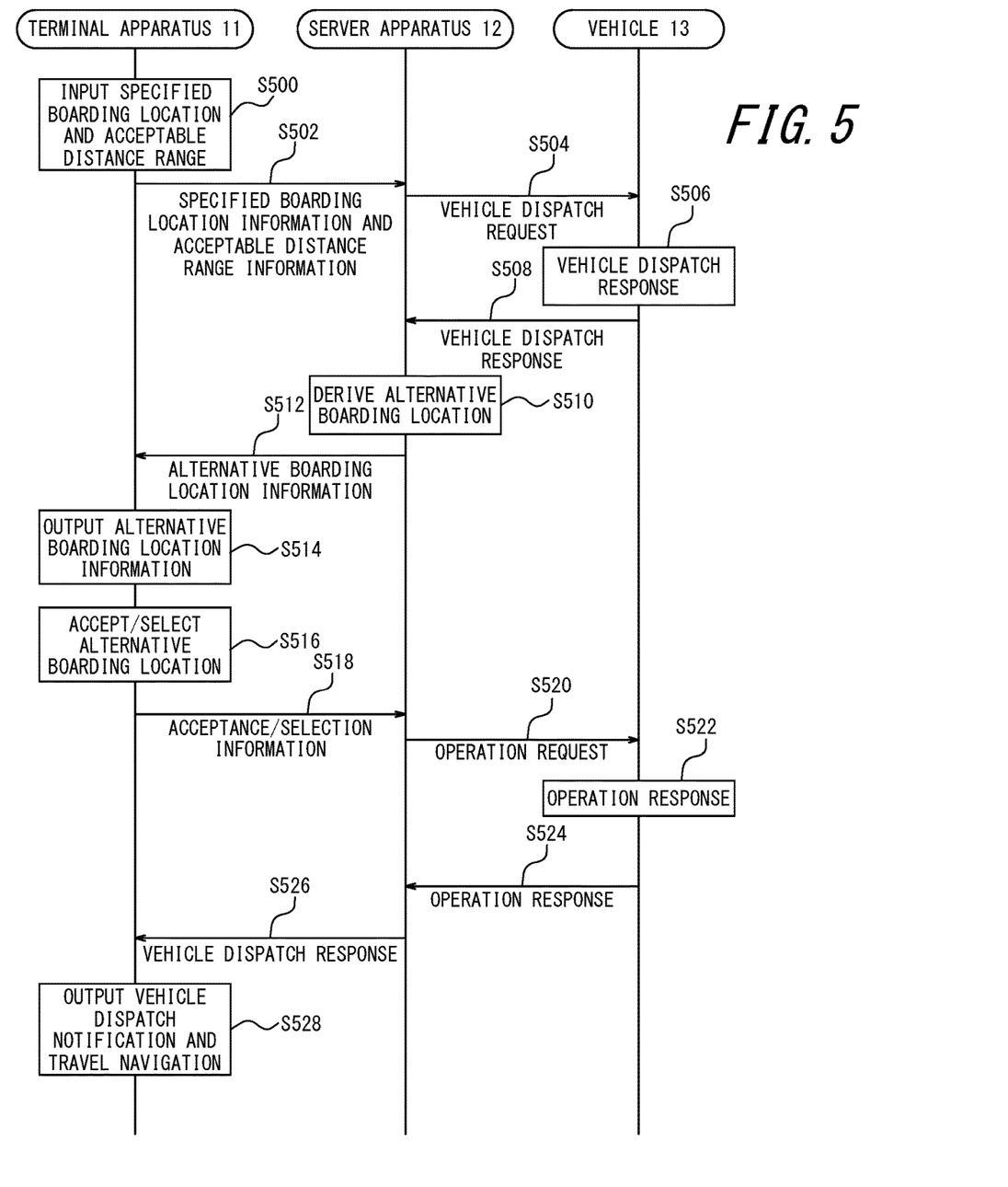
FIG. 5 is a sequence diagram illustrating an example of operations by the information processing system.

FIG. 5 is a sequence diagram illustrating operation procedures when the terminal apparatus 11, the server apparatus 12, and the vehicle-mounted apparatus 40 of the vehicle 13 operate in cooperation. The procedures in FIG. 5 are performed when a passenger operates the terminal apparatus 11 to launch the vehicle dispatch application of the terminal apparatus 11.

In step S500, the terminal apparatus 11 receives input of a specified boarding location and acceptable distance range from a passenger. For example, the controller 21 of the terminal apparatus 11 receives map information from the server apparatus 12 in accordance with the current location of the terminal apparatus 11, uses the output interface 26 to display the map information, and prompts the passenger to input the specified boarding location. The passenger inputs the specified boarding location by, for example, tapping a desired point on the map or by inputting an address. Alternatively, the controller 21 may use the current location of the terminal apparatus 11 as the specified boarding location. The passenger also inputs a distance range over which movement from the specified boarding location is acceptable (such as several hundred meters or less) as the acceptable distance range. The controller 21 then receives the input from the passenger via the input interface 25.

In step S502, the terminal apparatus 11 transmits specified boarding location information including the positional information for the specified boarding location and acceptable distance range information including the acceptable distance range to the server apparatus 12. The controller 21 of the terminal apparatus 11 uses the communication interface 23 to transmit the information for the specified boarding location to the server apparatus. The controller 31 of the server apparatus uses the communication interface 33 to receive the specified boarding location information and acceptable distance range information.

The acceptable distance range information may be transmitted to the server apparatus 12 once when the pedestrian sets preferences rather than each time the vehicle dispatch application is executed.

In step S504, the server apparatus 12 generates a vehicle dispatch request based on the specified boarding location information and transmits the vehicle dispatch request to the vehicle-mounted apparatus 40. The controller 31 of the server apparatus 12 uses the communication interface 33 to transmit the vehicle dispatch request to the vehicle-mounted apparatus 40 of one or more vehicles 13 to request that the vehicle head towards the specified boarding location. The controller 41 of the vehicle-mounted apparatus 40 uses the communication interface 43 to receive the vehicle dispatch request.

In step S506, the vehicle-mounted apparatus 40 generates a vehicle dispatch response to respond to the vehicle dispatch request. The controller 41 of the vehicle-mounted apparatus 40 uses the output interface 46 to display the position of the specified boarding location included in the received vehicle dispatch request to the driver, uses the input interface 45 to receive an operation by the driver responding with regard to availability for the vehicle dispatch request, and generates a vehicle dispatch response relating to vehicle dispatchability. When the vehicle is dispatchable, the vehicle dispatch response includes information such as an identification number of the vehicle 13 and the current location of the vehicle 13. When the generated vehicle dispatch response indicates that the vehicle is dispatchable, the vehicle-mounted apparatus 40 transmits the vehicle dispatch response to the server apparatus 12 in step S508. The controller 41 of the vehicle-mounted apparatus 40 uses the communication interface 43 to transmit the vehicle dispatch response to the server apparatus 12. The controller 31 of the server apparatus 12 uses the communication interface 33 to receive the vehicle dispatch response. The controller 31 ends reception of the vehicle dispatch response upon receiving the first vehicle dispatch response.

In step S510, the server apparatus 12 derives an alternative boarding location for the dispatchable vehicle 13, i.e. the vehicle 13 that transmitted the vehicle dispatch response. In the server apparatus 12, the controller 31 derives alternative boarding locations on one or more routes from the current location of the vehicle 13 to the specified boarding location, for example. The one or more routes include the route with the shortest distance, the route with the shortest time, and the like. For example, when a plurality of routes expected to be the same distance or time is retrieved, the controller 31 derives an alternative boarding location on each route.

Figure 6:
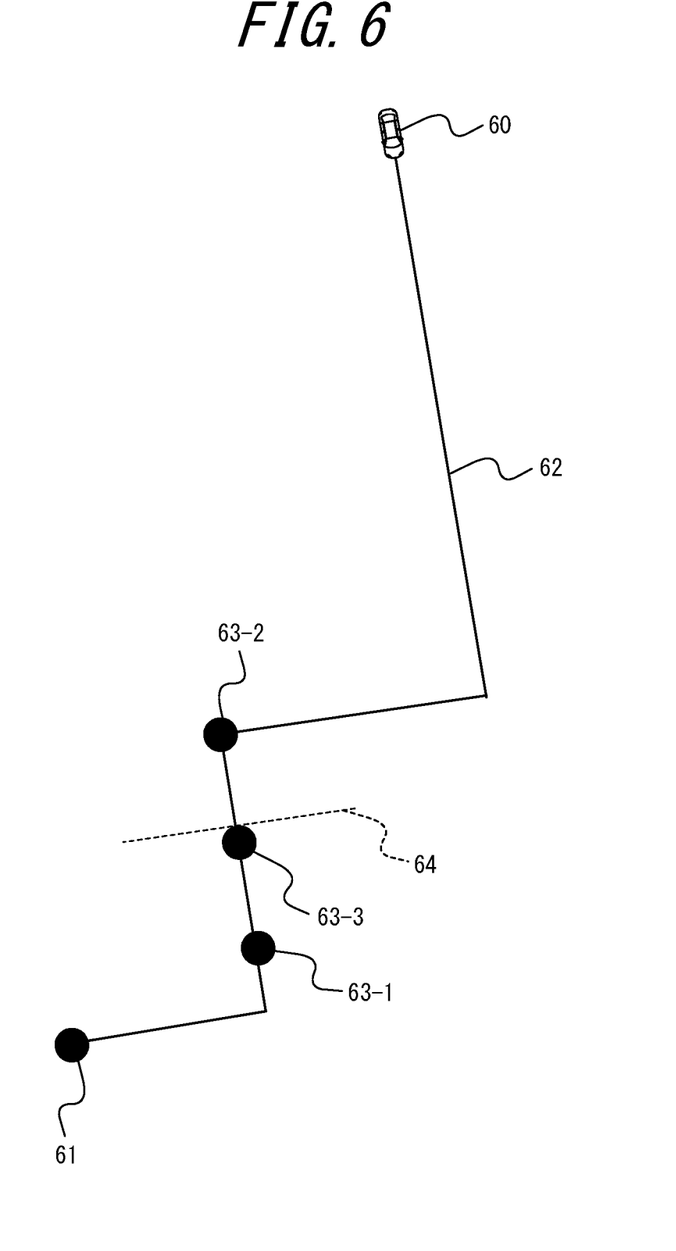
FIG. 6 is a diagram illustrating an example of boarding locations.

FIG. 6 schematically illustrates an example of deriving alternative boarding locations on a certain route 62 from a current location 60 of the vehicle 13 to a specified boarding location 61. For example, the controller 31 derives theoretical alternative boarding location candidates where the passenger and the vehicle 13 would meet along the route 62 when the passenger moves along the route 62 from the specified boarding location 61 at a freely set walking speed (for example, 4 km/h to 6 km/h), and the vehicle 13 moves along the route 62 from the current location 60 at a freely set traveling speed (for example, the legal speed for the route). When the specified boarding location 61 differs from the current location of the terminal apparatus 11, a point where the passenger meets the vehicle 13 while moving from the current location may be used as an alternative boarding location candidate. Candidate points typically treated as boarding locations, such as an intersection or bend on the road, or a location near a landmark, may be stored in advance in the memory 32 in association with the map information, and the nearest candidate point of the point where the passenger and vehicle 13 meet along the route 62 may be used as an alternative boarding location candidate. For example, when an alternative boarding location candidate 63-1 is derived from the specified boarding location 61 within the acceptable distance range 64, the controller 31 adopts the alternative boarding location candidate 63-1 as an alternative boarding location 63-1. In this case, the pedestrian and vehicle 13 arrive at the alternative boarding location 63-1 at approximately the same time. The passenger can therefore board the vehicle 13 immediately, eliminating wasted time for both the passenger and the vehicle 13. On the other hand, when an alternative boarding location candidate 63-2 is derived from the specified boarding location 61 outside of the acceptable distance range 64, the controller 31 adopts an alternative boarding location 63-3 on the border of the acceptable distance range 64. In this case, the pedestrian will have some time to wait until the vehicle 13 arrives, but the pedestrian need not move beyond the acceptable distance range. The convenience for the pedestrian can therefore be improved. The controller 31 also calculates the time for the vehicle 13 to arrive at the alternative boarding location 63-1 or 63-3. This time is calculated for each alternative boarding location.

The controller 31 of the server apparatus 12 may estimate the traveling speed of the vehicle 13 using not only the legal speed but also road traffic information or road environment information and may derive the alternative boarding location candidates based on the estimated traveling speed. The road traffic information includes traffic jam conditions at various locations of the roads on the map. The road environment information includes the conditions of the road environment that can affect the traveling speed, such as the number of lanes on the road, the width of the road, whether there is construction, and traffic restrictions such as one-way traffic. The server apparatus 12 can, for example, acquire these pieces of information from another server apparatus for distributing road traffic information or road environment information. The use of road traffic information or road environment information enables derivation of alternative boarding locations after the time required for movement of the vehicle 13 is estimated based on more current conditions.

Returning to FIG. 5, in step S512, the server apparatus 12 transmits alternative boarding location information to the terminal apparatus 11. The controller 31 of the server apparatus 12 uses the communication interface 33 to transmit the alternative boarding location information, which includes information on the route of the vehicle 13, positional information for the alternative boarding location for each route, and information on the time until arrival of the vehicle 13 at each alternative boarding location, to the terminal apparatus 11. The controller 21 of the terminal apparatus 11 uses the communication interface 23 to receive the alternative boarding location information.

In step S514, the terminal apparatus 11 outputs the alternative boarding location information. The controller 21 of the terminal apparatus 11 uses the output interface 36 to display the alternative boarding location information to the passenger. Then, in step S516, the terminal apparatus 11 receives input from the passenger to accept or select an alternative boarding location. For example, the controller 21 of the terminal apparatus 11 receives, via the input interface 25, a tap by the passenger on an image on the display screen.

Figure 7:
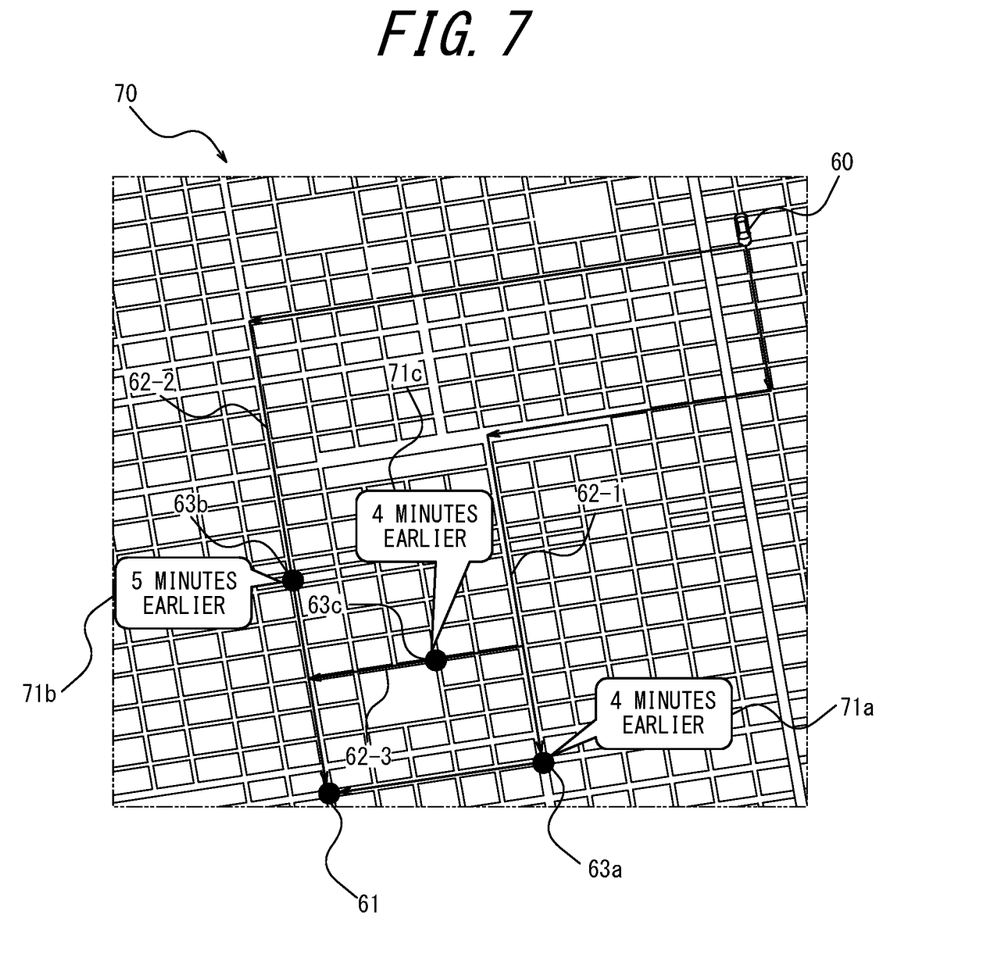
FIG. 7 is a diagram illustrating an example display screen on a terminal apparatus.

FIG. 7 illustrates an example of a display/input screen for alternative boarding location information on the terminal apparatus 11. On a display screen 70 of the terminal apparatus 11, the specified boarding location 61, the current location 60 of the vehicle 13, the routes 62-1, 62-2, 62-3 from the current location 60 to the specified boarding location 61, and the alternative boarding locations 63a, 63b, and 63c on the respective routes are displayed superimposed on the map. Furthermore, the time until arrival of the vehicle 13 at the alternative boarding locations 63a, 63b, 63c is displayed by indications 71a, 71b, 71c, for example, as the difference in time from the arrival of the vehicle 13 at the specified boarding location 61, i.e. the amount of the time reduction. For example, an indication 71a is displayed at the alternative boarding location 63a on the route 62-1 indicating that the time until arrival of the vehicle 13 is reduced by 4 minutes. An indication 71b is displayed at the alternative boarding location 63b on the route 62-2 indicating that the time until arrival of the vehicle 13 is reduced by 5 minutes. Finally, an indication 71c is displayed at the alternative boarding location 63c on the route 62-3 indicating that the time until arrival of the vehicle 13 is reduced by 4 minutes.

The passenger confirms the information contained on the screen 70 and taps, for example, one of the alternative boarding locations 63a, 63b, 63c to select one of the alternative boarding locations. The passenger can recognize and compare the shortened times by the indications 71a, 71b, 71c. The passenger can also select an alternative boarding location on the map in accordance with the passenger's needs or preferences while taking into consideration characteristics of the area, such as the traffic on the roads, proximity to public facilities such as a park, proximity to various landmarks, and safety. When there is only one alternative boarding location, the passenger confirms and taps the alternative boarding location on the screen 70 to accept the alternative boarding location.

Referring back to FIG. 5, in step S518, the terminal apparatus 11 transmits acceptance/selection information to the server apparatus 12 indicating the alternative boarding location accepted or selected by the passenger. The controller 21 of the terminal apparatus 11 uses the communication interface 23 to transmit acceptance/selection information to the server apparatus. The controller 31 of the server apparatus uses the communication interface 33 to receive the acceptance/selection information.

In step S520, the server apparatus 12 generates an operation request, requesting that the vehicle 13 move to the alternative boarding location, based on the positional information for the alternative boarding location accepted or selected by the passenger and transmits the operation request to the vehicle-mounted apparatus 40. The controller 31 of the server apparatus 12 uses the communication interface 33 to transmit the operation request to the vehicle-mounted apparatus 40. The controller 41 of the vehicle-mounted apparatus 40 uses the communication interface 43 to receive the operation request.

In step S522, the vehicle-mounted apparatus 40 generates an operation response to respond to the operation request. The controller 41 of the vehicle-mounted apparatus 40 uses the output interface 46 to display the alternative boarding location included in the received operation request to the driver, uses the input interface 45 to receive an operation by the driver responding with regard to availability for the vehicle dispatch request, and generates an operation response relating to operability. This can improve time efficiency for the driver who responds to the request for vehicle dispatch to the specified boarding location, since the driver can move to the alternative boarding location in a shorter time. When operation is possible, the operation response includes information such as an identification number of the vehicle 13 and the current location of the vehicle 13. Upon generation of an operation response indicating that operation is possible, the vehicle-mounted apparatus 40 transmits the operation response to the server apparatus 12 in step S524. The controller 41 of the vehicle-mounted apparatus 40 uses the communication interface 43 to transmit the operation response to the server apparatus 12. The controller 31 of the server apparatus 12 uses the communication interface 33 to receive the operation response.

In step S526, the server apparatus 12 generates a vehicle dispatch response corresponding to the received operation response and transmits the vehicle dispatch response to the terminal apparatus 11. The controller 31 of the server apparatus 12 calculates the estimated arrival time to the alternative boarding location based on the current location of the vehicle 13, for example. The controller 31 then generates the vehicle dispatch response to include the identification number, the current location, the estimated arrival time, and the like of the vehicle 13. The controller 31 then uses the communication interface 33 to transmit the vehicle dispatch response to the terminal apparatus 11. The controller 21 of the terminal apparatus 11 uses the communication interface 23 to receive the vehicle dispatch response.

In step S528, the terminal apparatus 11 outputs the vehicle dispatch response to the passenger. The controller 21 of the terminal apparatus 11 uses the output interface 36 to display the vehicle dispatch response to the passenger. For example, together with text information such as "vehicle dispatch complete", the estimated arrival time and the like of the vehicle 13 to the alternative boarding location are displayed, and text or audio prompting to move to the alternative boarding location are outputted. Once the passenger and the vehicle 13 arrive at the alternative boarding location, the passenger boards the vehicle 13 and begins riding.

According to the present embodiment, convenience can be improved for passengers using a vehicle dispatch service in the vicinity of venues for events such as sports or music, large-scale facilities such as conference halls, and the like. The volume of traffic or the direction of travel may differ between different roads facing the block where a large-scale facility is located. In such cases, the dispatched vehicle 13 can meet the passenger more smoothly and quickly if the passenger simply moves from one end of the block to the other end. The present embodiment supports judgments and actions by such a passenger. In other words, the time until arrival of the vehicle 13 can be shortened while placing an acceptable burden on the passenger, thereby improving convenience for the passenger. This can also improve time efficiency for the driver of the vehicle 13, who can board the passenger and begin charging more quickly.

In the above embodiment, a processing/control program that specifies operations of the terminal apparatus 11 and the vehicle-mounted apparatus 40 may be stored in the memory 42 of the server apparatus 12 or in the memory of another server apparatus and be downloaded onto each apparatus via the network 14. The processing/control program may also be stored on a non-transitory recording/storage medium readable by each apparatus, and each apparatus may read the program from the medium.

The present disclosure is not limited to the embodiments described above. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

What is claimed is:
1. A server apparatus comprising:
a communication interface; and
a controller configured to transmit/receive information to/from another apparatus via the communication interface, wherein when a first boarding location is specified by a terminal apparatus:
  the controller determines one or more second boarding locations that are within a predetermined distance range from the first boarding location and reachable by a vehicle at a time earlier than the first boarding location, wherein the controller identifies the one or more second boarding locations based on positional information of the vehicle determined by a positioner, road traffic information, direction of travel for roads, a walking speed of a passenger, and a traveling speed for the vehicle on the roads such that a time from a passenger request to boarding the vehicle is reduced compared to the first boarding location thereby improving a time efficiency of a vehicle dispatch process,
  the controller transmits, via the communication interface to the terminal apparatus, alternative boarding location information for display on a display screen of the terminal apparatus, the alternative boarding location information comprising the one or more second boarding locations, respective routes from a current location of the vehicle to the one or more second boarding locations for superimposed display on a map for display on the terminal apparatus, an indication configured to display a reduced amount of time for the vehicle to arrive at the respective one or more second boarding locations, and a prompt to accept or select one of the one or more second boarding locations,
  the controller receives, via the communication interface from the terminal apparatus, a response to the prompt indicting an accepted or selected one of the one or more second boarding locations, wherein the one of the one or more second boarding locations is a location that the vehicle and the passenger arrive at approximately the same time thereby reducing waiting time for both the vehicle and the passenger,
  the controller generates an operation request to move the vehicle to the accepted or selected one of the one or more second boarding locations based on positional information for the accepted or selected one of the one or more second boarding locations and the vehicle, and
  the controller transmits, via the communication interface to the vehicle, the operation request to move the vehicle to the accepted or selected one of the one or more second boarding locations.

2. The server apparatus of claim 1, wherein the controller is configured to derive the one of the one or more second boarding locations for each route from the current location of the vehicle to the first boarding location.

3. The server apparatus of claim 1, wherein the controller is configured also to transmit, to the terminal apparatus, information on a time until arrival of the vehicle at the one of the one or more second boarding locations.

4. The server apparatus of claim 1, wherein the one or more second boarding locations is a location such that when the vehicle arrives at the one of the one or more second boarding locations, the passenger arrives from the first boarding location.

5. The server apparatus of claim 1, wherein the controller is configured to derive the one or more second boarding locations using road traffic information or road environment information.

6. The server apparatus of claim 1, wherein the controller is configured to receive information on the predetermined distance range from the terminal apparatus.

7. An information processing system comprising:
  the server apparatus of claim 1; and
  the terminal apparatus.

8. A non-transitory medium readable by a terminal apparatus configured to communicate with a server apparatus, the non-transitory medium storing a program which, when executed by the terminal apparatus, causes the terminal apparatus to execute operations comprising:
  transmitting information specifying a first boarding location to the server apparatus; and
  receiving, from the server apparatus, alternative boarding location information for display on a display screen of the terminal apparatus, the alternative boarding location information comprising one or more second boarding locations, respective routes from a current location of a vehicle to the one or more second boarding locations for superimposed display on a map for display on the terminal apparatus, an indication configured to display a reduced amount of time for the vehicle to arrive at the respective one or more second boarding locations, and a prompt to accept or select one of the one or more second boarding locations, wherein the one or more second boarding locations is within a predetermined distance range from the first boarding location, and reachable by a vehicle earlier than the first boarding location, and wherein the one or more second boarding locations are identified based on positional information of the vehicle determined by a positioner, road traffic information, direction of travel for roads, a walking speed of a passenger, and a traveling speed for the vehicle on the roads such that a time from a passenger request to boarding the vehicle is reduced compared to the first boarding location thereby improving a time efficiency of a vehicle dispatch process,
  displaying, on the display screen of the terminal apparatus, the map comprising an indication of the current location of the vehicle, the respective routes, the one or more second boarding locations, and the indication at each of the one or more second boarding locations displaying the reduced amount of time for the vehicle to arrive at the respective one or more second boarding locations,
  transmitting, to the server apparatus, a response to the prompt indicting an accepted or selected one of the one or more second boarding locations; and
  transmitting information accepting or selecting the one of the one or more second boarding locations to the server apparatus and causing the server apparatus to perform a process to dispatch the vehicle to the selected one of the one or more second boarding locations, wherein the one of the one or more second boarding locations is a location that the vehicle and the passenger arrive at approximately the same time thereby reducing wasted time for both the vehicle and the passenger.

9. The non-transitory medium of claim 8, wherein the program further causes the terminal apparatus to execute operations comprising:
  outputting information on the one of the one or more second boarding locations.

10. The non-transitory medium of claim 8, wherein the program further causes the terminal apparatus to execute operations comprising:

receiving, from the server apparatus, information on a time until arrival of the vehicle at the one of the one or more second boarding locations; and outputting information on the one of the one or more second boarding locations together with the information on the time.

11. The non-transitory medium of claim 8, wherein the program further causes the terminal apparatus to execute operations comprising transmitting information on the predetermined distance range to the server apparatus in response to input of the predetermined distance range.

12. The non-transitory medium of claim 8, wherein the program further causes the terminal apparatus to execute operations comprising outputting information to prompt movement to the one of the one or more second boarding locations.

13. A method of operating an information processing system comprising a server apparatus and a terminal apparatus configured to communicate with each other, the method comprising:

transmitting, by the terminal apparatus, information specifying a first boarding location to the server apparatus;

determining, by the server apparatus, one or more second boarding locations that are within a predetermined distance range from the first boarding location and reachable by a vehicle at a time earlier than the first boarding location, wherein the server apparatus identifies the one or more second boarding locations based on positional information of the vehicle determined by a positioner, road traffic information, direction of travel for roads, a walking speed of a passenger, and a traveling speed for the vehicle on the roads such that a time from a passenger request to boarding the vehicle is reduced compared to the first boarding location thereby improving a time efficiency of a vehicle dispatch process;

notifying to the terminal apparatus, by a communication interface of the server apparatus, alternative boarding location information for display on a display screen of the terminal apparatus, the alternative boarding location information comprising the one or more second boarding locations, respective routes from a current location of the vehicle to the one or more second boarding locations for superimposed display on a map for display on the terminal apparatus, an indication configured to display a reduced amount of time for the vehicle to arrive at the respective one or more second boarding locations, and a prompt to accept or select one of the one or more second boarding locations, displaying, on the display screen of the terminal apparatus, the map comprising an indication of the current location of the vehicle, the respective routes, the one or more second boarding locations, and the indication at each of the one or more second boarding locations displaying the reduced amount of time for the vehicle to arrive at the respective one or more second boarding locations, receiving, from the terminal apparatus, a response to the prompt indicting an accepted or selected one of the one or more second boarding locations, generating, by the server apparatus, an operation request to move the vehicle to the accepted or selected one of the one or more second boarding locations based on positional information for the accepted or selected one of the one or more second boarding locations and the vehicle, transmitting, by the communication interface of the server apparatus to the vehicle, the operation request to move the vehicle to the accepted or selected one of the one or more second boarding locations; and transmitting information accepting or selecting the one of the one or more second boarding locations to the server apparatus and causing the server apparatus to perform a process to dispatch the vehicle to the selected one of the one or more second boarding locations, wherein the one of the one or more second boarding locations is a location that the vehicle and the passenger arrive at approximately the same time thereby reducing wasted time for both the vehicle and the passenger.

14. The method of operating an information processing system of claim 13, further comprising:

transmitting, by the server apparatus, information on a time until arrival of the vehicle at the accepted or selected one of the one of the one or more second boarding locations; and outputting, by the terminal apparatus, information on the accepted or selected one of the one of the one or more second boarding locations together with the information on the time.

15. The method of operating an information processing system of claim 13, further comprising deriving, by the server apparatus, the one or more second boarding locations using road traffic information or road environment information.

16. The method of operating an information processing system of claim 13, further comprising receiving, by the server apparatus, information on the predetermined distance range from the terminal apparatus.

* * * * *